Patented May 20, 1952

2,597,493

UNITED STATES PATENT OFFICE 2,597,493

ANION-EXCHANGE POLYMERS OF VINYLANISOLE

Jesse C. H. Hwa, Philadelphia, Pa., assignor to Rohm & Haas Company, Philadelphia, Pa., a corporation of Delaware No Drawing. Application May 12, 1951, Serial No. 226,097

2 Claims. (Cl. 260—47)

This invention relates to anion-exchange polymers and to their preparation and use. It relates to insoluble anion-exchange resins of the weakly basic type which are proliferous polymers and which are characterized by unusually large areas of surface, very high degrees of porosity, high adsorptive capacity, and very rapid rates of adsorption. More specifically it relates to the preparation and use of polymers which have the chemical properties of weakly basic anion-exchangers and the physical properties of the so-called popcorn or proliferous polymers. As a result of this peculiar combination of chemical and physical properties, these ion-exchange resins have distinct advantages in some applications over the harder and denser weakly basic anion-exchangers employed heretofore. They are particularly suitable for use in catalysis, in peptic ulcer therapy, and in decolorization of beet sugar syrups because of their high surface areas and their very rapid rate of adsorption of acids.

Other anion-exchange resins of the weakly basic type are well known and are marketed in large volumes for the deionization of aqueous fluids in general. Such resins as are being currently used are described, for example in U. S. Patent No. 2,356,151 and in C. H. McBurney's United States application Serial No. 759,309, filed July 5, 1947, and are characterized by being hard, dense, infusible, insoluble, granular or spheroidal particles. As far as the chemical properties of these known resins and the chemistry of ion-exchange are concerned, the available products are very satisfactory. But the physical properties of these materials—particularly their hard, dense, granular form—limits their utility in many instances where their chemical properties would appear to make them ideally suited.

The products of this invention are all insoluble, proliferous or popcorn polymers. They are water-insoluble, proliferous polymers of vinylanisole, to the aryl nuclei of which are attached amino groups. The amino groups are attached to the aromatic nuclei by means of alkylene groups—preferably by methylene groups. These polymers are made, as will be described in greater detail below, by haloalkylating—preferably chloromethylating— an insoluble, proliferous polymer or copolymer of vinylanisole and then reacting the haloalkylated, proliferous product with a primary or secondary amine. As a result, the products are insoluble, proliferous polymers which are suitable for the removal of anions from fluids and which comprise the reaction product of an amine and a haloalkylated, proliferous copolymer of a major proportion of vinylanisole and a minor amount of a polyolefinic compound—such as divinylbenzene, butadiene, or isoprene—in which the olefinic linkages are in the acyclic portion of the molecule and are the reactive groups which enter into the proliferous copolymerization reaction, said proliferous copolymer containing an average of 0.2 to 1.5 haloalkyl groups per aromatic nucleus and the amine being either a primary or a secondary amine.

The proliferous polymers of vinylanisole, from which the anion-exchange resins of this invention are made, are themselves prepared most conveniently by maintaining at a temperature from about 50° C. to 100° C.—and preferably from 60° C. to 80° C.—a mixture of vinylanisole and an auxiliary polyolefinic compound which is copolymerizable with the vinylanisole and in which the olefinic linkages are in the acyclic portion of the molecule and are the sole functional groups which take part in the copolymerization reaction. It is suggested that the copolymerization be carried out in a closed system where the amount of oxygen is negligible. It is even better to conduct the copolymerization in an inert atmosphere because oxygen exerts an inhibiting effect on the formation of the proliferous product. The addition of a small but catalytic amount of a previously prepared proliferous polymer is also recommended since it serves as a seed from which the proliferous polymer grows rapidly.

Proliferous polymers or copolymers of vinylanisole are believed to be new, although other kinds of proliferous polymers have been known for some time. Thus Kondakow (J. prakt. Chim. [2] 64, p. 109 (1901)); Carothers (J. A. C. S. 53, p. 4203 (1931)); Staudinger et al. (Berichte 68, p. 1618 (1935)); Britton (U. S. Pat. No. 2,341,175 of February 8, 1944); Kharasch et al. (Ind. Eng. Chem. 39, p. 830 (1947)) and others have described various popcorn or proliferous polymers from other unsaturated, monomeric materials. Such popcorn polymers are distinct kinds of polymers and they have a community of physical properties. They are opaque, they have a sponge-like, porous structure, and they are insoluble in the very solvents which dissolve the homogeneous, thermoplastic polymers which are normally made from the same monomers. In most cases they look very much like popcorn and have been variously described as sponge-like, cauliflower-like, and coral-like. They have extremely high molecular weights and are apparently cross-linked to some extent. In addition, they are formed by an auto-catalyzed polymerzation and the characteristic way in which they form helps to identify them. In the process of preparing popcorn polymers the induction period may be long but once polymerization has started it proceeds rapidly until all or most of the monomer is consumed. It is characteristic of this type of polymerization that the polymer is insoluble in the monomeric material at all stages of the polymerization and that polymerization progresses in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

This invention relates primarily to the preparation of proliferous polymers of vinylanisole and to their conversion to anion-exchange resins which retain the physical properties of the proliferously polymerized vinylanisole from which they are made. This is not to say, however, that the conventional, non-proliferous, clear, cross-linked polymers of vinylanisole cannot also be converted to anion-exchange resins. They can be. But they do not give rise to resins with as large surface areas, or as rapid rates of adsorption, or as high capacities per unit of weight as are obtained from the proliferous polymers. As a matter of fact, some of the clear, non-proliferous polymer is frequently formed together with the proliferous polymer; and while this can be separated, it does not have to be, since it reacts chemically like the proliferous polymer and its presence merely dilutes, as it were, the advantages of the proliferous polymer.

In general, low temperatures favor the formation of proliferous polymers whereas higher temperatures favor the formation of the clear polymers. For this reason it is preferred that the polymerization of vinylanisole be carried out at temperatures from about 50° C. to 80° C. In this range the rate of formation of the proliferous polymer is fast enough to be practical while the formation of the clear, non-proliferous polymer is negligible—particularly in view of what was discussed above. At temperatures from 80° C. to 100° C. the proportion of clear polymer increases at the expense of the proliferous product and above 100° C. the clear product forms to the complete exclusion of the proliferous resin.

A wide variety of polyolefinic compounds, as described above, definitely assist in the formation of the popcorn polymers of vinylanisole. The auxiliary compounds function as popping agents. Examples of some of the best auxiliary agents include divinylbenzene, isoprene, butadiene, bimethallyl, biallyl, trivinylbenzene, dicyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in U. S. Patents Nos. 2,311,615 and 2,341,175. The auxiliary compounds copolymerize with the vinylanisole and consequently are present in the final copolymeric products.

The most satisfactory and suggested amounts of auxiliary compounds are from 2% to 30%, based on the weight of this material and of the vinylanisole. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of vinylanisole, it is also true that these compounds differ in degree in regard to the effect they have on the density and porosity of the final copolymer. For example, divinylbenzene, which is recognized as a particularly fast and efficient cross-linking agent for vinyl compounds in general, aids very materially in the popping of vinylanisole, but it also gives rise to harder, less porous popcorn polymers than do many of the other auxiliary agents such as butadiene or isoprene. Consequently the amount, within the limits set forth above, of the auxiliary copolymerizable compound which is employed is determined by the degree of porosity or extent of surface-area which is desired in the final product.

The use of a seed to promote the proliferous polymerization is not necessary but is most desirable. The material which is used as a seed can have the same chemical composition as the proliferous polymer which it is desired to make or it can have a different chemical composition. A convenient method involves adding a small amount of a previous batch of proliferous polymer to subsequent mixtures of monomeric material which are to be popped. Even the quantities of one batch which may adhere to the equipment serve to seed subsequent batches. The word "seed" is used herein in the accepted chemical sense and itself indicates that the amount required is very small and that the material is insoluble in the reaction mixture. As little as about 0.001%, on a weight basis, is adequate.

Vinylanisole can be made to polymerize proliferously in bulk or in solution or while suspended in an immiscible liquid medium. The advantage of carrying out the polymerization by the suspension technique is that the final product is obtained in the form of discrete particles which adsorb ions unusually rapidly and which, although small, possess the advantageous properties of popcorn polymers such as porosity, high surface area, and rapid rates of adsorption.

It appears that free radicals, such as are provided by peroxidic compounds, play a part in the formation of the opaque, proliferous polymers, just as they do in the formation of clear, glass-like polymers. In proliferous polymerization, however, the amount of the peroxidic compounds, such as benzoyl, lauroyl, stearoyl peroxides, tert.-butyl hydroperoxide and the inorganic per-salts, which can be tolerated is relatively very low and shall not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers and copolymers of vinylanisole are first haloalkylated and then reacted with a primary or secondary amine. This step of haloalkylating involves introducing into a proliferous polymer a plurality of bromoalkyl or, preferably, chloroalkyl groups having the general formula $C_nH_{2n}X$, in which $n$ is an integer of value one to four and X represents an atom of chlorine or bromine. While groups containing one to four carbon atoms are embraced by this invention, it is preferred to employ those compounds in which chloromethyl groups, $-CH_2Cl$, are added to the insoluble polymer, because the chloromethyl products are by far the most reactive. The carbon atoms in the group $-C_nH_{2n}X$ may be in a straight or a branched chain.

The step of haloalkylating the insoluble copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the $-CH_2Cl$ group and which also serve as guides for introducing $-C_2H_4X$, $-C_3H_6X$, and $-C_4H_8X$ groups are described in "Organic Reactions," vol. I, chapter 3, page 63 et seq. (John Wiley & Sons, Inc., New York city, 1942).

The extent of the haloalkylation reaction may be conveniently determined by a halogen analysis. It is desirable that as many haloalkyl groups as possible be introduced into the insoluble copolymer because the number of such groups determines the number of molecules of the amine which may be subsequently introduced into the resin molecule; and, of necessity, the number of molecules of amine thus introduced determines the ultimate capacity of the resin to adsorb anions. Although resins containing relatively few amino groups have some capacity for adsorbing anions, it is necessary from a practical standpoint to add a large number of such groups in order to produce a resin of sufficiently high capacity as to be commercially attractive. And since, as stated, the number of molecules of amine which can react is determined largely by the number of haloalkyl substituents in the resin molecule, it is important that the minimum number of such substituent haloalkyl groups should be one for every fifteen anisole nuclei. The upper limit is reached when every available position in the aromatic nuclei is haloalkylated. Satisfactory resins of high capacity can be made in which the number of haloalkyl groups, and hence the number of molecules of reacted amine which are introduced, is less than the theoretical maximum. Thus, very valuable resins are those made by aminating copolymers containing from three to six haloalkyl groups for every four aromatic anisole nuclei.

The next step in the formation of the anion-exchange resin is the amination of the haloalkylated copolymer with a primary and/or a secondary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing amino groups, is freed from the liquid.

It has been found to be advantageous to swell the haloalkylated polymer prior to its reaction with the amine. This swelling facilitates the subsequent amination reaction and may be carried out by soaking the polymer in a suitable liquid, the most common of which are aromatic hydrocarbons such as benzene and toluene. Frequently, the volume of the polymer will increase as much as 100%, although the amount of swelling depends to a great extent upon the amount of cross-linking which has taken place during the preparation of the original polymer. In general, the amount of swelling is inversely proportional to the degree of cross-linking.

The amines which are employed are used in the form of the free base. The prime requirement is that they contain at least one amino-nitrogen atom to which is attached one or two reactive hydrogen atoms. The amines which are preferred in this application are those which are primary or secondary and in which the amino group or groups are attached to a hydrocarbon group. Other amines may be used, however, including those wherein the hydrocarbon group of the amine carries a substituent group. Such amines may be exemplified by ethanolamine and diethanolamine. For best results, the amino compound should not contain substituent groups which are themselves reactive under the conditions employed in aminating the haloalkylated resin.

As stated, the preferred amines are those in which the amino-nitrogen atom is attached to one or two unsubstituted hydro-carbon groups. Primary and secondary amines are operable, as well as mixtures of the two types, and polyamines, including those having primary and secondary amino groups such as polyalkylene polyamines. The hydrocarbon portion of the amine may be aliphatic, aromatic, cycloaliphatic, araliphatic, and alkaromatic. The following typify those amines which are all suitable in this invention when used individually or in mixtures with one another: Methylamine, dimethylamine, n-butylamine, iso-butylamines, dibutylamines, aniline, benzidine, o-, m-, and p-toluidines, xylidines, alpha- and beta-naphthylamine, naphthalene diamines, benzylamine, dibenzylamine, phenylene diamine, benzyl aniline, benzyl ethylamine, methyl aniline, cyclohexylamine, dicyclohexylamine, diethylene triamine, triethylene tetramine, tetraethylene pentamine, 3,3'-iminobispropylamine, and propylene diamine.

The following examples in which all parts are by weight are presented in order that the preparation and properties of the products of this invention may be thoroughly understood and recognized. The examples, which are illustrative, are not to be taken, however, as limiting this invention.

EXAMPLE 1

This serves to show how monomeric vinylanisole can be conveniently converted into proliferous or popcorn polymers. In each case a glass tube was partially filled with the mixture of vinylanisole to be popped. A small piece—a seed—of a previously prepared proliferous copolymer of approximately 90% vinylanisole and 10% isoprene was added. The mixtures contained a major portion of vinylanisole and a minor portion of a polyolefinic, auxiliary compound as a popping agent which was known to be copolymerizable with the vinylanisole. Nitrogen was bubbled through the mixture in order to flush oxygen from the tubes and thereafter the tubes were sealed with foil-lined caps and were placed in a constant-temperature water-bath. The kinds and amounts of the auxiliary popping agents which copolymerized proliferously with the vinylanisole are listed below in Table I together with other pertinent data. The percentages of the components of the mixture are based on the total weight of the copolymerizable mixtures. An induction period, as recorded, is that length of time during which no visible change takes place in the monomeric mixture and is followed by a period of propagation during which the polymer is formed on the seed by proliferation. Ordinarily, the induction period is several times as long as the period of propagation.

Table I

| Auxiliary Compound | Benzoyl Peroxide | Temperature | Induction Period |
|---|---|---|---|
|  | Per cent | °C. |  |
| 10% Butadiene | 0 | 65 | About 1 day. |
| Do | 0.1 | 50 | 1 to 2 days. |
| 20% Butadiene | 0 | 65 | About 1 day. |
| 10% Isoprene | 0 | 65 | About 3 days. |
| 6% Commercial Divinylbenzene.[1] | 0.05 | 65 | 1 to 2 days. |
| 10% Butadiene and 6% Commercial Divinylbenzene.[1] | 0.05 | 65 | About 1 day. |

[1] The commercial divinylbenzene contained approximately 44% divinylbenzene and 56% ethylstyrene.

EXAMPLE 2

A proliferous copolymer of 90% vinylanisole and 10% butadiene was chloromethylated as follows: 23.3 parts (equivalent to 0.15 mole of polymerized vinylanisole) of the copolymer (the first described in Example 1 above) was soaked in 370 parts of ethylene dichloride for one hour, during which time the polymer swelled markedly. To the mixture contained in a 3-necked flask equipped with stirrer, thermometer, and reflux condenser was added 36 parts (0.45 mole) of chloromethyl ether, $CH_2ClOCH_3$, and this mixture was stirred at room temperature for one and one-half hours. Then 60 parts (0.45 mole) of anhydrous aluminum chloride was added slowly while the mixture was maintained at a temperature of 20°–30° C. by means of external cooling. The mixture was stirred and maintained at room temperature overnight. Thereafter 600 parts of water was added and the resultant mixture was stirred for one hour. The resin was filtered off and was thoroughly washed with water, after which it was dried in an oven overnight at 65° C. Analysis showed that the product contained 8.1% chlorine (corresponding to a product in which 81% of the aromatic nuclei were chloromethylated. Inspection revealed that this chloromethylated material was still in the form of a popcorn or proliferous polymer.

EXAMPLE 3

The chloromethylated proliferous product of Example 2 was aminated as follows: in a 3-necked flask equipped with stirrer, thermometer, and reflux condenser were mixed eight parts of the dry product of Example 2 and 70 parts of toluene. The mixture was heated at 80° C. for an hour during which the polymer swelled after which it was cooled to room temperature. Then 19.3 parts of diethylenetriamine was added and the mixture was heated to refluxing temperature and held there for five hours. The reaction mixture, cooled to room temperature, was next filtered and the resinous product was washed thoroughly with water and was then stripped of toluene and amine by steam-distillation. The final product was separated and dried. When tested with a solution of hydrochloric acid it was found to have a capacity of 2.6 milli-equivalents for each gram of dry resin and had the same general physical structure as the original proliferous vinylanisole copolymer and the chloromethylated copolymer from which it was prepared.

The method described above was followed in the preparation of a wide variety of proliferous polymers having ion-exchange properties by chloromethylating the other proliferous vinylanisole polymers of Example 1 above and then aminating the chloromethylated products with such amines as dimethylamine, ethylamine, triethylenetetramine, and tetraethylenepentamine. All of the products retained the general physical properties of the popcorn vinylanisole copolymers from which they were made.

The products of this invention are all members of that class of compounds known as weakly basic anion-exchange resins. Thus, they do adsorb acids from fluids but are not capable of splitting neutral salts such as sodium chloride. For the latter purpose a strongly basic anion-exchange resin is necessary such as the proliferous polymers of vinylanisole which contain quaternary ammonium groups and which are described in another of my applications, Serial No. 226,098, filed May 12, 1951.

I claim:

1. As a new composition of matter, an opaque, infusible, proliferous polymer which is capable of adsorbing acids from fluids and which comprises the reaction product of an amine from the class consisting of primary and secondary amines and a haloalkylated proliferous polymer containing at least 70% proliferously polymerized vinylanisole to the aromatic nuclei of which are attached substituent haloalkyl groups of the formula

$$—C_nH_{2n}—X$$

in which $n$ is an integer of value one to four and X is an atom of a halogen from the class consisting of chlorine and bromine, the number of said substituent groups being at least one for every 15 aromatic nuclei in said polymer.

2. As a new composition of matter, an opaque, infusible, proliferous polymer which is capable of adsorbing acids from fluids and which comprises the reaction product of an amine from the class consisting of primary and secondary amines and a chloromethylated proliferous copolymer of a mixture of (a) 70% to 99.5% vinylanisole and (b) 30% to 0.5% of a polyolefinic, organic compound which is copolymerizable with vinylanisole and in which the olefinic linkages are in the acyclic portion of the molecule and are the reactive groups which enter into the proliferous copolymerization reaction, said proliferous copolymer containing on the aromatic nuclei thereof substituent chloromethyl groups, —$CH_2Cl$, the number of said chloromethyl groups being at least one for every 15 aromatic nuclei in said copolymer.

JESSE C. H. HWA.

No references cited.